US009607134B2

(12) United States Patent
Dulkin et al.

(10) Patent No.: US 9,607,134 B2
(45) Date of Patent: Mar. 28, 2017

(54) SYSTEM AND METHOD FOR PROTECTED PUBLICATION OF SENSITIVE DOCUMENTS

(71) Applicant: Cyber-Ark Software Ltd., Petach-Tikva (IL)

(72) Inventors: Andrey Dulkin, Herzlia (IL); Ori Hirshfeld, Tel-Aviv (IL); Oded Valin, Nahariya (IL)

(73) Assignee: Cyber-Ark Software Ltd., Petach-Tikva (IL)

( * ) Notice: Subject to any disclaimer, the term of this patent is extended or adjusted under 35 U.S.C. 154(b) by 0 days.

(21) Appl. No.: 14/246,098

(22) Filed: Apr. 6, 2014

(65) Prior Publication Data

US 2015/0121548 A1 Apr. 30, 2015

Related U.S. Application Data

(60) Provisional application No. 61/894,923, filed on Oct. 24, 2013.

(51) Int. Cl.
*G06F 17/30* (2006.01)
*H04N 7/16* (2011.01)
*G06F 21/16* (2013.01)

(52) U.S. Cl.
CPC ...... *G06F 21/16* (2013.01); *G06F 2221/0775* (2013.01)

(58) Field of Classification Search
CPC ...... G06F 21/10; G06F 21/31; G06F 21/6218; H04L 63/102

USPC ......... 713/168–174, 182–186, 202; 709/206, 709/225, 229, 249, 389; 726/21–33
See application file for complete search history.

(56) References Cited

U.S. PATENT DOCUMENTS

| | | | |
|---|---|---|---|
| 6,601,108 B1 | 7/2003 | Marmor | |
| 6,944,822 B1 | 9/2005 | Schriber | |
| 7,475,341 B2 | 1/2009 | Malik | |
| 2003/0076978 A1* | 4/2003 | Eversole | G06F 17/30011 382/100 |
| 2004/0172376 A1* | 9/2004 | Kobori | H04L 29/12594 |
| 2005/0021539 A1* | 1/2005 | Short | H04L 9/001 |
| 2006/0010103 A1 | 1/2006 | Malik | |
| 2009/0300139 A1* | 12/2009 | Shoemaker et al. | 709/217 |

FOREIGN PATENT DOCUMENTS

KR 101057743 8/2011

* cited by examiner

*Primary Examiner* — Evans Desrosiers (57) ABSTRACT

Protected publication of sensitive documents with authentication and accountability enables storing and sharing confidential files, while reducing risk that a recipient will distribute and share the file information with unauthorized recipients. Every user request for an original file generates a unique provided file based on the original file, the user request, and configuration information. The provided file has characteristics that make the provided file based on a first user request unique from any other provided file based on any other user request. Unique characteristics include changing the format of the original file to another format for the provided file, altering file properties, altering file content, and watermarking.

19 Claims, 3 Drawing Sheets

SYSTEM AND METHOD FOR PROTECTED PUBLICATION OF SENSITIVE DOCUMENTS

FIELD OF THE INVENTION

The present invention generally relates to file security, and in particular, concerns a system and method for protected publication of sensitive documents.

BACKGROUND OF THE INVENTION

File publication, and specifically document publication, deals with providing content from one party to another in a structured way. Often, this structured way requires security, both at rest and in transmit, as well as accountability— knowing that who created and who retrieved which file, when the file was retrieved, and for what reason. Additionally, publishers may want to limit the functionality and operations available for the recipient on the file, such as prevent editing or printing. Moreover, publishers may wish to inform the user of such limitations, create some sort of legal obligation regarding what actions are allowed and, most importantly, control distribution and re-distribution of content.

One known solution is converting documents to images, and then presenting the images to recipients. Conventional image-generating (conversion) solutions pre-convert an original file to a file format to be distributed, store the converted file, and upon request provide the user with the converted version. Some solutions add watermark on images/PDFs after conversion and store the converted and watermarked version until retrieved. Some solutions may create a specific watermark for every copy provided to user, yet these solutions store the converted version and add the watermark later. This creates unnecessary file versions, unnecessary security risk (having a version stored in a non-secure storage), and operational complexity.

A conventional commercial solution is Box/Crocodoc. These products use conventional presentation of documents as images, so special techniques are used to protect the provided document in transit or at the receiving user interface, and lack secure storage.

Another conventional commercial solution is Watchdox. This product builds protection into the document, however the original document format is retained.

Another conventional solution is DRM (Data Rights Management) solutions. This solution requires a server to manage permissions and the original document format is retained.

Another conventional solution is DLP (data loss/leak prevention) solutions. These techniques protect documents from leaking out of a network. The original document format is retained.

A conventional solution is US application 20060010103 to Dale Malik for "Version control in a distributed computing environment". In this application, Malik teaches maintaining and controlling different versions of electronic files in a distributed server environment. This provides a system to ensure that a file provided in response to a request from a local storage is the same as the master version stored remotely. This teaching is in essence the opposite of what is desired in securely providing files in which there is a benefit to every provided copy of an original file to be unique from every other provided copy.

Another conventional solution is U.S. Pat. No. 7,475,341 to Dale W. Malik for "Converting the format of a portion of an electronic document". In this patent, Malik teaches converting searchable elements of a document to unsearchable images, and enables replacing the searchable elements with image replacements. This teaching specifically enables editing of the document content. In contrast, a desire when presenting protected publication of sensitive documents is to prevent editing of the provided document.

Another conventional solution is U.S. Pat. No. 6,601,108 to Eliyahu Marmor for "Automatic conversion system". In this patent, Marmor teaches a technique specific to Internet hypertext documents for changing the document to enable a different representation of same content for a client, by changing the syntax to address user standard. This means that if two requests are sent with the same "user standard", the resulting document will be the same. In contrast, a desire when providing a sensitive document is to provide a unique version for every retrieval.

Another conventional solution is U.S. Pat. No. 6,944,822 to Daniel Schreiber for "Method and apparatus for preventing reuse of text, images, and software transmitted via networks." In this patent, Schreiber teaches a conventional technique for converting searchable text to images. A request for an original file results in providing the same provided file for each request. In contrast, a desire when providing a sensitive document is to provide a unique version for every retrieval.

Another conventional solution is KR 101057743 to Bae for "A system for distributing secured documents to outside users." In this patent, Bae teaches a technique for inserting a watermark into an original document as part of format conversion and encoding. This is a conventional watermarking technique that results in providing the same provided file for each request. In contrast, a desire when providing a sensitive document is to provide a unique version for every retrieval.

Note that in all of the above-cited conventional teachings, there is a failure to address the need for authentication of requesting users and providing only the requested and authorized information to authenticated users. In addition, conventional techniques do not include features enabling accountability, often a critical feature for modern file retrieval systems.

There is therefore a need for a system and method for protected presentation of sensitive documents with authentication and accountability.

SUMMARY

According to the teachings of the present embodiment there is provided a method for secure publication, including the steps of: receiving one or more user requests for an original file, wherein a first of the user requests includes credentials for a first user; accessing the original file based on the first user request and a configuration; generating a provided file based on the original file, the first user request and the configuration wherein the provided file is at least a portion of the original file; properties of the provided file are different from properties of the original file; and the properties of the provided file are different from properties of any provided file generated based on a user request other than the first user request.

According to the teachings of the present embodiment there is provided a system for secure publication including a secure processing server configured for: receiving one or more user requests for an original file, wherein a first of the user requests includes credentials for a first user; accessing the original file based on the first user request and a configuration; generating a provided file based on the original file, the first user request and the configuration wherein the provided file is at least a portion of the original file; properties of the provided file are different from properties of the original file; and the properties of the provided file are different from properties of any provided file generated based on a user request other than the first user request.

In an optional embodiment, the original file is accessed from storage in a secure storage. In another optional embodiment, the first user request is authenticated by the secure storage, and if authentication is successful the secure storage allowing access to the original file. In another optional embodiment, the first user request is authenticated prior to accessing the original file, and allowing access to the original file is dependent on successful authentication.

In another optional embodiment, accessing the original file is preceded by the first user request to a configuration server, and receiving from the configuration server the configuration.

In another optional embodiment, the provided file is presented in a secure presentation control that limits possible user actions. In another optional embodiment, the provided file is provided to the first user as a stream of binary data, thereby preventing caching on a user machine.

Another optional embodiment includes watermarking of the provided file, the watermarking including adding visible or non-visible elements to the provided file from a group consisting of:
  (a) information from the first user request;
  (b) requesting user name;
  (c) requesting user identification;
  (d) requesting user network address;
  (e) time of first user request;
  (f) time of accessing the original file;
  (g) time of generation of the provided file; and
  (h) information from the configuration.

In another optional embodiment, after the first user is authenticated for access to the original file: a second user makes available a new version of the original file; a new provided file is generated based on the new version of the original file, the first user request, and the configuration; and the new provided file is presented to the first user.

In another optional embodiment, details regarding elements and transactions in the system are logged. In another optional embodiment, logged information facilitates accountability selected from a group consisting of:
  (a) which user created the original file;
  (b) which user requested the original file;
  (c) which user retrieved the provided file;
  (d) time of request for the original file;
  (e) time of retrieval of the provided file;
  (f) time of processing of the original file;
  (g) type of processing of the original file;
  (h) reasons for the first user request;
  (i) which pages of the provided file the first user accessed through a secure presentation control; and
  (j) watermarking information.

In another optional embodiment, the properties are selected from a group consisting of:
  (a) file format,
  (b) file metadata,
  (c) time of creation,
  (d) date of creation,
  (e) time of modification,
  (f) date of modification,
  (g) file content,
  (h) portion of original file,
  (i) additions to the original file, and
  (j) watermarking.

According to the teachings of the present embodiment there is provided a computer-readable storage medium having embedded thereon computer-readable code for secure publication, the computer-readable code including program code for: receiving one or more user requests for an original file, wherein a first of the user requests includes credentials for a first user; accessing the original file based on the first user request and a configuration; generating a provided file based on the original file, the first user request and the configuration wherein the provided file is at least a portion of the original file; properties of the provided file are different from properties of the original file; and the properties of the provided file are different from properties of any provided file generated based on a user request other than the first user request.

According to the teachings of the present embodiment there is provided a computer program that can be loaded onto a server connected through a network to a client computer, so that the server running the computer program constitutes a server in a system according to any one of the above system claims.

According to the teachings of the present embodiment there is provided a computer program that can be loaded onto a computer connected through a network to a server, so that the computer running the computer program constitutes a client computer in a system according to any one of the above system claims.

BRIEF DESCRIPTION OF FIGURES

The embodiment is herein described, by way of example only, with reference to the accompanying drawings.

DETAILED DESCRIPTION

Figure 1:
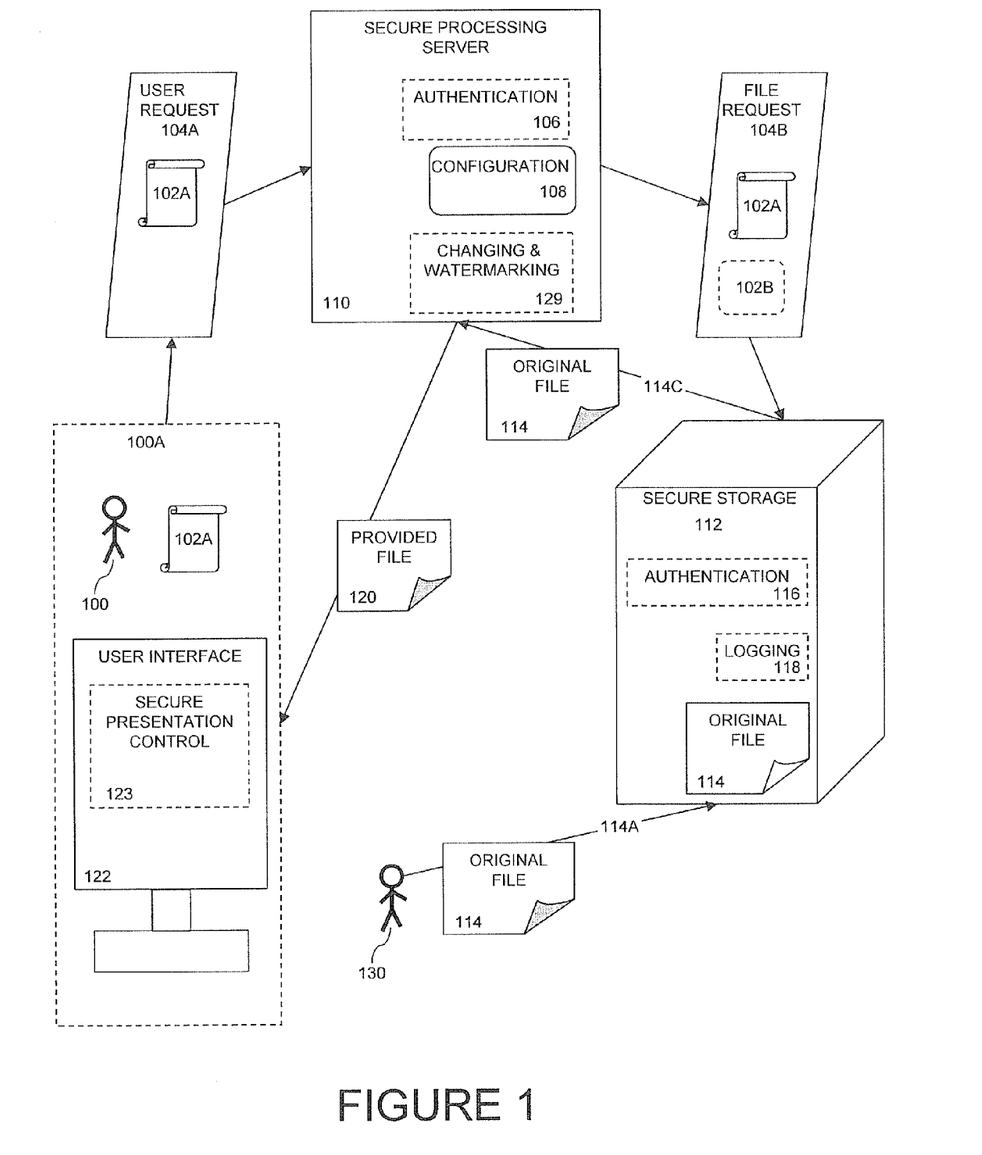
FIG. 1—a diagram of a system for protected publication of sensitive documents.
Figure 2:
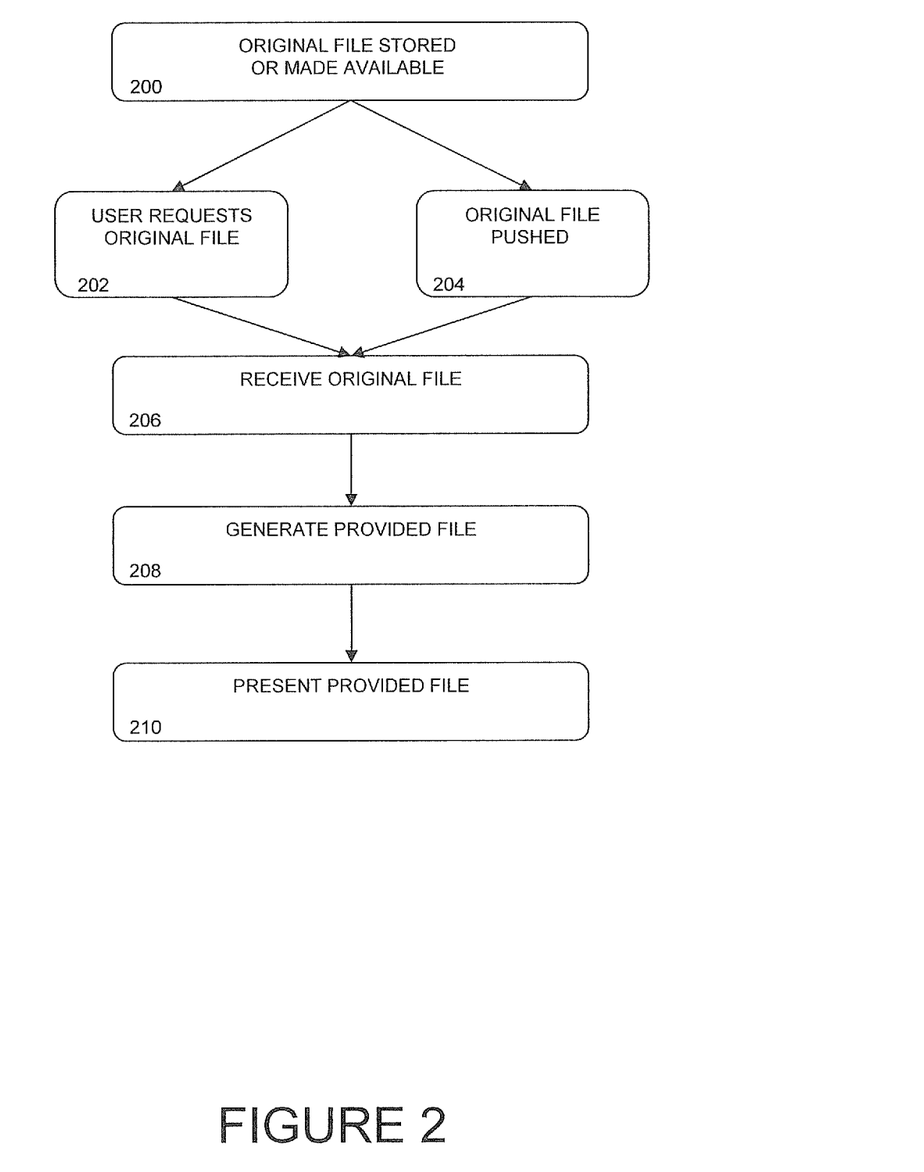
FIG. 2—a flowchart of a method for protected publication of sensitive documents.
Figure 3:
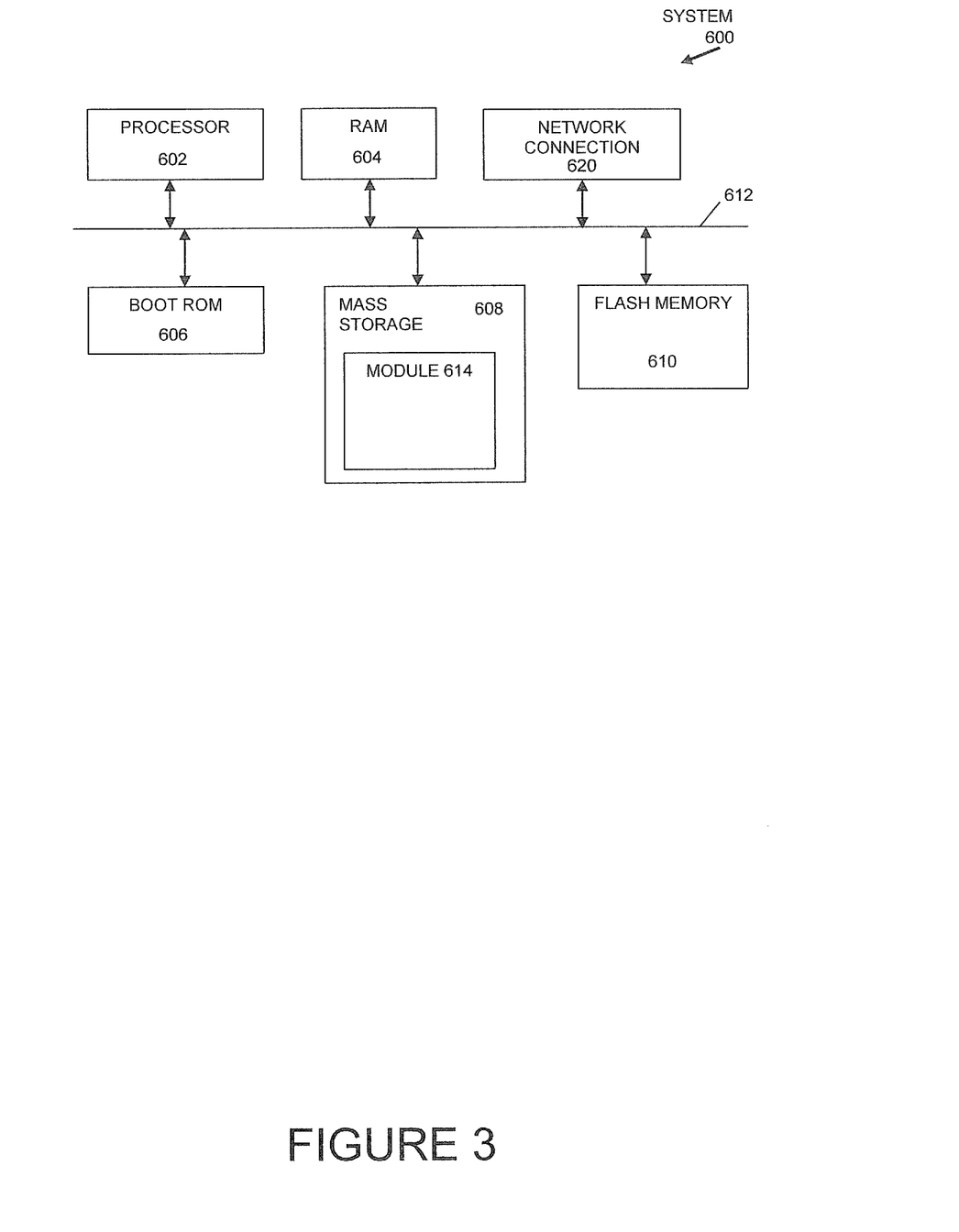
FIG. 3—a high-level partial block diagram of an exemplary system

FIGS. 1 to 3

The principles and operation of the system and method according to a present embodiment may be better understood with reference to the drawings and the accompanying description. A present invention is a system and method for protected publication of sensitive documents supporting authentication and accountability.

Every user request for an original file generates a unique provided file based on the original file, the user request, and configuration information. The provided file has characteristics that make the provided file based on a first user request unique from any other provided file based on any other user request. Unique characteristics include changing the format of the original file to another format for the provided file, altering file properties, altering file content, and watermarking.

Current solutions for sharing files with third parties are cumbersome. Sharing file content while protecting that file content from unauthorized access is a difficult problem. Conventional solutions are limited to techniques such as only allowing a third party to view a preview of file content. Conventional image-generating (conversion) solutions pre-convert an original file to a file format to be distributed, store the converted file, and upon request provide the user with the converted version. In contrast, a feature of the current embodiment is creating a unique file for every file request.

Implementations of the current embodiment facilitates storage of highly confidential documents in a secure storage while allowing third parties to view these confidential documents securely, thus limiting unauthorized access (copying or storing) of file content, as compared to conventional solutions. Organizations can use the techniques of the current embodiment to share confidential information with users, while protecting the content of the confidential information, thereby implementing "for-your-eyes-only" procedures.

Typical uses of the current embodiment include:
  Board communications—sensitive documents being shared between board members.
  Sensitive private data (financial, health, education, personal and other)—enabling third parties to view sensitive private data, without an owner of the data losing control over the data.
  Legal information shared with partners, contractors and other third parties.

Referring now to the drawings, FIG. 1 is a diagram of a system for protected publication of sensitive documents. A typical case includes a user 100 requesting a file. User 100 has associated credentials 102A and a user interface 122. A more general reference to the user 100 is as the user and environment 100A. A user request 104A is initiated by the user, the request including credentials 102A. Secure processing server (SPS) 110 receives the user request 104A. Based on the user request 104A, SPS 110 retrieves a configuration 108. Optionally, SPS 110 includes authentication 106 to authenticate user credentials 102A before generating file request 104B, thus if the user request 104A fails authentication, the process will stop. Configuration 108 may be used to include optional additional information 102B in file request 104B. Based on the retrieved configuration 108, SPS 110 generates a file request 104B to access an original file 114 from secure storage 112. File request 104B typically includes user credentials 102A. Secure storage 112 preferably includes authentication 116 to authenticate credentials 102A as a basis for retrieving original file 114 from secure storage 112. Preferably, secure storage 112 includes logging 118. Original file 114 is processed by SPS 110, based on the user request 104A and configuration 108, to generate a provided file 120. The provided file 120 is provided to the user, typically being displayed on a user interface 122. The provided file 120 is at least a portion of the original file 114 and properties of the provided file 120 are different from properties of the original file 114. A significant feature of the SPS is generating a unique provided file 120 from an original file 114 for each user request 104A, in particular when the same original file 114 is requested by a more than one user requests. A typical way of publishing original file 114 is for a second user 130 to publish original file 114 to secure storage 112, for clarity shown as arrow 114A.

In the context of this document, the term "provided file" refers to at least a portion of an original file. In some cases, the provided file may be the entire contents of the original file. In other cases, the provided file can be only a subset of the information contained in the original file. For example, in the case of a text document, the provided file may be the entire text of the document, or may be only selected pages from the original text document. In other cases, the provided file can include additional information than the original file, for example adding empty pages, legal paragraphs, title, credits, and other information.

Publication generally refers to providing the provided file to the requesting user. In other words, providing at least a portion of a file to a user. Publication includes delivery of the provided file. Optionally, publication can include presentation and/or display of the provided file to a user.

Credentials are well known in the art, generally referring to information used for verification of an entity. In particular, credentials 102A of user 100 can be used to verify that the user 100 is who the user 100 claims to be. User credentials can be used in authentication at various processing stages of the system.

In the context of this document, the term "unique" generally refers to generating a plurality of provided files, where each provided file is different from every other provided file. In other words, no two provided files are alike. The uniqueness may be implemented in metadata, i.e. the properties of the file, such as type, date of creation, other information embedded in the format, and/or in the content of the file, for example by request-dependent watermarking, selection of a portion of the original file, and addition of additional information to the content (see above).

For clarity in this description, a common case of a human user requesting a document is used for illustration. One skilled in the art will realize that this description is not limiting, and user 100 can be a software application or hardware. Similarly, while a case of the original file 114 being a text document is used in this description, the original file being requested can be any type of file, such as a spreadsheet, image, audio, video, binary, etc.

User credentials can be authenticated at a variety of points in the system. Preferred locations for authentication are shown in the current figure, including authentication 106 in the SPS 110 and authentication 116 in the secure storage. Depending on the specific implementation, user credentials may be authenticated at other points in the system, both shown and not shown in the diagram. As appropriate, the un-authenticated credentials 102A and authenticated credentials (not shown in the figure) can be included in requests and used by the various elements of the current embodiment. For example, optionally, the credentials 102A can be authenticated 106 in the SPS, resulting in request 104B optionally including additional information 102B.

A Secure Processing Server (SPS 110) can be implemented on a variety of platforms depending on the specifics of the application for which the SPS 110 is to be used. For example, an SPS can be implemented on a server on a network (intra-net, internet, or Internet), or as a module running on a web-application server.

A received user request 104A is used at least in part by the SPS 110 to retrieve a configuration 108. Configurations are typically used on the SPS 110. The process of "retrieving a configuration" can refer to a variety of implementations. A typical implementation includes simply referencing logic on the SPS 110 that processes the user request 104A to generate a file request 104B. Other implementations of retrieving a configuration include, but are not limited to:
  Based on the received user request 104A, the SPS 110 generates a query/request to a configuration sever (not shown in the current figure), the configuration server returns a configuration, and the SPS 110 processes the user request 104A in combination with the returned configuration.
  Configurations can be stored locally on the SPS 110, or stored remotely on another module, for example in secure storage 112, and retrieved by the SPS 110.
  Configurations can be used one or more times in the process of providing a requested file. A first time is using a configuration 108 on SPS 110 when receiving a user request 104A to access an original file 114 on secure storage 112. The configuration 108 can include logic or instructions indicating if there is a need for additional, preliminary authentication (such as if credentials should be authenticated on the SPS 110, optional authentication 106), how to generate file request 104B, what is the network location of secure storage 112, what additional information 102B to include in file request 104B, how to access the requested file (original file 114), what is the location of original file 114 in the secure storage 112, etc.

For clarity, retrieving of original file 114 from secure storage 112 is shown as arrow 114C.

A second time of using configuration 108 on SPS 110 is after retrieving original file 114. Configurations hold the logic guiding how to generate a provided file, such as what portions of an original file should be provided, if portions of the original file should not be provided (for example, at the time of the user request, or to the requesting user), if there should be additions to the provided file not in the original file (for example, if a watermark should be added and what the content of the watermark should be, or if additional content should be added), if portions of the original file should be modified, and what properties of the original file should be modified. See the below description of characterization of the provided file for additional discussion related to configurations affecting the provided file. Optionally, at least a part of the user request 104A can be used in combination with the configuration 108 to generate the provided file 120.

Preferably, authentication of credentials 102A is implemented at least on the secure storage 112. Implementations of secure storage are available from Cyber-Ark Software Ltd. (Petach Tikva, Israel), such as the Digital Vault solution, based on Network Vaults as disclosed in U.S. Pat. No. 6,356,941. Other secure storage solutions are available from other vendors.

A feature of the current embodiment is providing increased management of access rights, as compared to conventional techniques. For example, preferably, a user is authenticated to the secure storage 112 and no document retrieval is possible without proper rights at the source (secure storage level/secure storage 112). Preferably, if a user requesting a file does not have access rights to the requested file, the user is unaware of the file's existence.

For every user request 104A, a unique provided file 120 is generated from the original file 114, in accordance with details of the user request 104A and stored configuration 108. The unique provided file 120 is characterized by:
1. The provided file 120 has different properties than the original file 114. In other words, the provided file 120 is typically in a different file format than the original file 114. For example, if original file 114 is a text file, the provided file 120 can be an image or sequence of images. An example of a sequence of images is converting each page of a multiple-page request into an individual image.
2. The provided file 120 can be a part (subset, portion) of the original file 114. For example, if the original file is a 20-page text document, the provided file may be a sequence of 15 images, each image in the sequence showing one page of 15 pages from the original 20 pages.
3. The provided file 120 can include additional parts not present in the original file 114. For example, SPS 110 can add blank pages, terms of use, legal notices, signatures, etc. to the original file when generating the provided file.
4. The provided file 120 has characteristics that make the provided file based on a first user request 104A unique from any other provided file based on any other user request. For example, if user request 104A for original file 114 generates provided file 120, then a second user request for original file 114 generates a second provided file (not shown in the current diagram). Uniqueness of provided files can be provided by a variety of techniques. Options for uniqueness include, but are not limited to:

Altering file properties, such as file format;

Altering file properties, such as file metadata (for example, time of creation, file type, information embedded in file format and others); and Altering file content, for example by selection a portion of the original file, or adding additional content;

Adding one or more visible watermarks to the file content (for example, the requesting user name or identification, time of retrieval, user network address, information from the configuration 108, information from the user request 104A, etc.).

Watermarking can include watermarking not only of text documents, but also of all file types such as video, images, etc.

Optionally and preferably providing provided file 120 from the SPS 110 to the user interface 122 is done using secure presentation control 123. Secure presentation control 123 prevents a user 100 from performing a defined set of operations on the provided file. Limitations enforced by secure presentation control 123 can include preventing a user from downloading, copying, printing, saving, forwarding, or changing the provided document 120. Secure presentation control 123 can include a navigation and display component that the user 100 is required to use to view portions of the provided file (for example, pages of a text document being displayed on user interface 122 as images). Possible methods for implementing secure presentation limitations 123 include:
1. Disabling right-mouse click: Overriding an event that a browser calls when a user uses the context menu ('oncontextmenu'), replacing the call with an empty function—this causes nothing to happen when the user right clicks the image.
2. Disabling print: Using CSS3 tags, the page look is manipulated when the page is being printed (for example, using the '@media print' tag).
3. No dragging of the image: Overriding an event ('ondrag') that a browser calls when a user tries to drag an element. The event is replaced with a function that does nothing.

A typical implementation of user interface 122 is a web browser, such as Chrome, Firefox, or Internet Explorer. The user interface 122 can be used by the user 100 to request a document, such as a request for an original file and to view the resulting provided file. A common feature of such browsers is to store cached versions of images and other content that the browsers present or download. Such cached versions are stored on the user machine and can later be retrieved by the browser to speed up presentation, but can also be retrieved by users or attackers who have access to the machine on which the browser resides. Therefore, there is a need to prevent caching of provided file 120 on user machine 100A.

A feature of the current embodiment is providing increased protection for documents in transit, as compared to conventional techniques. Preferably, the communication protocols used to transmit documents between storage (such as secure storage 112), document processing (such as SPS 110), and a user (such as user interface 122) are secure and encrypted.

Another feature of the current embodiment is providing increased protection for documents in a user interface, as compared to conventional techniques. Limitations are enforced by a secure presentation control (such as secure presentation control 123) to prevent a user (such as user 100) from downloading, copying, printing, saving, forwarding or changing the document. Exemplary implementations are described above.

Optionally and preferably, the system includes logging 118. The logging 118 is generally implemented as one or more modules at one or more locations in the system including the secure storage module 112, the SPS 110, and as a separate module. In the current figure, logging 118 is shown in secure storage 112. Logging modules on system elements can actively or passively collect data, consolidate, process, store, and/or forward for storage at a local or remote location, such as in secure storage 112. A portion or all details regarding elements and transactions in the system can be logged for real-time or later review. For example, details of user 100, user request 104A, requested file (original file 114), file request 104B, original file 114, provided file 120, watermarking 129, etc.

Logging facilitates accountability, often a critical feature for modern file retrieval systems. Accountability includes knowing who created, requested, and retrieved a file, time of request, time file retrieved, and processing metadata (time of processing, type of processing, etc.), reasons for requesting, watermarking information (see below), etc. In the current embodiment, accountability can be implemented by a variety of methods.

A first method of facilitating accountability is the use of watermarking. In this case, a watermark is embedded into the original file 114 as part of generating a provided file 120. The watermark can contain the details of the specific user 100 requesting the file, user name, user identification (user ID), time of request, date of request, time/date of processing, publisher name and/or identification (ID), document creation/modification time and/or date, and other details. Thus, if a user manages to circumvent limitations of secure presentation control 123, for example printing a document page, watermarking facilitates determining from the printout of the provided file who was the user that received/printed the file. This accountability can then be used as appropriate, for example to take legal action against the user who printed the provided file/page.

A second method of facilitating accountability includes the use of activity logging—all document retrievals are logged with a desired set of details (for example, publisher, document, etc.) regarding a user requesting an original file. Thus, knowing who was the user that retrieved a document is possible and, if needed, act accordingly.

An innovative technique for securing the provided file 120 and preventing caching uses a byte stream for transmission from SPS 110 to user interface 122. On SPS 110, the generated provided file is converted into a byte stream, and the byte stream is then transmitted from SPS 110 to user interface 122. Prior to transmission, a receiving/conversion module is downloaded from the SPS to the user interface. Such module is, preferably, the secure presentation control 123. The receiving/conversion module includes instructions for how to process the transmitted byte stream from the SPS 110 and convert the byte stream into an appropriate format for presentation in user interface 122. As the transmission of the provided file 120 is as a byte stream, the typical user interface 122, i.e. a web browser, will not cache the file. Thus, if a user wishes to retrieve the provided file, the user will not be able to do so, and will need to follow the above-described method to retrieve file 114 again.

Referring again to FIG. 1, a typical way of publication using the above-described system is for a second user 130 to store an original file 114 in the secure storage 112. Then, user 100 can retrieve this original file 114 by following the above-described process. For example, second user 130 can send a message to user 100, notifying user 100 that original file 114 is available for retrieval, optionally including a link or reference to original file 114 location on secure storage 112. Similarly and optionally, SPS 110 or secure storage 112 can monitor published files and can send a message to user 100. User request 104A can then include this reference, to inform the Secure Processing Server 110 of the requested file. Alternatively, user 100 can browse a list of available files on secure server 112 and select the file user 100 requests.

An alternative way of publication is possible if there is already an open user interface 122 and open connection between the user interface 122 and the SPS 110. Second user 130 can store a new or updated version of an original file on secure storage 112. Second user 130 may indicate (not shown in figure) to the SPS 110 that file 114 is available or SPS 110 can scan (not shown in figure) secure storage 112 for new files. SPS 110 can then retrieve original file 114, process original file 114 and push the provided file 120 to the user interface 122. In this case, if there are several users each with corresponding user interfaces with open connections to the SPS 110, every user interface will receive a unique provided file 120, based on the original file 114 and configuration 108.

The present invention can be used for different types of file publication, including manual (for example, by second user 130), automated (when second user 130 can be an application, software, or hardware), scheduled (for example, taking original file 114 from other locations, such as second user 130 local storage and storing original file 114 on secure storage 112), or ad-hoc (for every specific document).

FIG. 2 is a flowchart of a method for protected publication of sensitive documents. In block 200, an original file is stored or made available. As described above, a typical case is second user 130 storing original file 114 on secure storage 112 (arrow 114A). Alternatively, in block 200 second user 130 can store a new or updated version of an original file on secure storage 112. In block 202, a first user 100 requests an original file, such as user request 104A for original file 114. In block 204, a first user has already been authenticated for access to an original file, and the original file is pushed toward the user, for example from secure storage 112 to SPS 110. In block 206, the original file 114 is received, for example by the SPS 110 for processing. In block 208, the original file is processed, for example as described above, based on the original file 114, first user request 104A and configuration 108 to generate a provided file, for example provided file 120. In block 210, the provided file is presented to the requesting user, such as provided file 120 being transmitted to user interface 122 for the secure presentation control 123 to present to the requesting user 100.

FIG. 3 is a high-level partial block diagram of an exemplary system 600 configured to implement a secure processing server of the present invention. System (processing system) 600 includes a processor 602 (one or more) and four exemplary memory devices: a RAM 604, a boot ROM 606, a mass storage device (hard disk) 608, and a flash memory 610, all communicating via a common bus 612. As is known in the art, processing and memory can include any computer readable medium storing software and/or firmware and/or any hardware element(s) including but not limited to field programmable logic array (FPLA) element(s), hard-wired logic element(s), field programmable gate array (FPGA) element(s), and application-specific integrated circuit (ASIC) element(s). Any instruction set architecture may be used in processor 602 including but not limited to reduced instruction set computer (RISC) architecture and/or complex instruction set computer (CISC) architecture. A module (processing module) 614 is shown on mass storage 608, but as will be obvious to one skilled in the art, could be located on any of the memory devices.

Mass storage device 608 is a non-limiting example of a computer-readable storage medium bearing computer-readable code for implementing the secure publication methodology described herein. Other examples of such computer-readable storage media include read-only memories such as CDs bearing such code.

System 600 may have an operating system stored on the memory devices, the ROM may include boot code for the system, and the processor may be configured for executing the boot code to load the operating system to RAM 604, executing the operating system to copy computer-readable code to RAM 604 and execute the code.

Network connection 620 provides communications to and from system 600. Typically, a single network connection provides one or more links, including virtual connections, to other devices on local and/or remote networks. Alternatively, system 600 can include more than one network connection (not shown), each network connection providing one or more links to other devices and/or networks.

System 600 can be implemented as a server or client respectively connected through a network to a client or server.

A feature of the current embodiment is providing increased protection for documents at rest, as compared to conventional techniques. The term "documents at rest" is known in the field to refer to documents being stored for use and not currently being accessed. Documents at rest can include original files 114 and pre-prepared files based on original files. Until retrieved, documents are stored in secure storage (such as secure storage 112) and are not processed into images or unnecessarily retrieved. The documents are also not stored in document processing modules (such as SPS 110) nor in a user interface application (such as user interface 122).

In one implementation, in the document processing modules, the document is received as stream from the secure storage, converted to images, and sent to a client, without remaining in any persistent storage (cache, disk, database, etc.) of the processing module. In other words, the retrieved document resides only in volatile memory (such as RAM) of the processing modules. In another implementation, the user interface application (such as browser on a user terminal) does not receive an actual image. Instead, image communication provides the image of the retrieved document as an array of bytes, not formatted as an image, thus preventing usual caching mechanisms found in browsers from storing a copy of the image in cache or as a temporary internet file.

Conventional solutions convert an original document in an original format into a converted format for distribution of the converted document. This converted document is stored, and when requested the converted document is provided to the requesting user. In contrast, a feature of the current embodiment is that a publisher can continue editing an original document and whenever a user requests and is provided the original document, the user will be provided the most recent variation of the document.

Note that a variety of implementations for modules and processing are possible, depending on the application. Modules are preferably implemented in software, but can also be implemented in hardware and firmware, on a single processor or distributed processors, at one or more locations. The above-described module functions can be combined and implemented as fewer modules or separated into sub-functions and implemented as a larger number of modules. Based on the above description, one skilled in the art will be able to design an implementation for a specific application.

To the extent that the appended claims have been drafted without multiple dependencies, this has been done only to accommodate formal requirements in jurisdictions that do not allow such multiple dependencies. Note that all possible combinations of features that would be implied by rendering the claims multiply dependent are explicitly envisaged and should be considered part of the invention.

Note that the above-described examples, numbers used, and exemplary calculations are to assist in the description of this embodiment. Inadvertent typographical and mathematical errors do not detract from the utility and basic advantages of the invention.

It will be appreciated that the above descriptions are intended only to serve as examples, and that many other embodiments are possible within the scope of the present invention as defined in the appended claims.

What is claimed is:

1. A method for distributing files over a network, comprising:
    executing a code on at least one hardware processor of a system managing a secure storage, said code comprises instructions for:
        receiving over a network a plurality of user requests for an original file from a plurality of different user machines of a plurality of users;
        generating a plurality of unique provided file versions of said original file each for one of said plurality of user requests, said plurality of unique provided file versions are different from one another and from said original file;
        wherein each of said unique provided file is generated based on the version of said original file, user request and configuration;
        transmitting each of said plurality of unique provided file versions over said network to one of said plurality of different user machines in response to one of said plurality of user requests; and
    logging information associating each of said plurality of unique provided file versions with a respective user request of said plurality of user requests for later identification of accountability of a distribution of any of said plurality of unique provided file versions; wherein each of said plurality of unique provided file versions having one or more elements which are different from respective one or more elements of all other of said plurality of unique provided file versions and of said original file, said one or more elements are selected from a group consisting of: a file format, a portion of said original file which is uniquely modified, a unique addition to a version of said original file, and a watermark indicative of at least one of an identity of a user associated with one of said plurality of user requests, a time of receiving one of said plurality of user requests, and a provided file generation time.

2. The method of claim 1, wherein said original file is accessed from a secure storage.

3. The method of claim 2, wherein said step of generating said plurality of unique provided file versions is contingent on authentication of said user request by said secure storage.

4. The method of claim 1, further comprising authenticating said plurality of user requests.

5. The method of claim 1, further comprising the steps of:
sending said user request to a configuration server; and
receiving said configuration from said configuration server.

6. The method of claim 1, wherein said plurality of unique provided file versions are provided to said plurality of different user machines in a secure presentation control that limits a set of operations associated with said unique provided file.

7. The method of claim 1, wherein each of said plurality of unique provided file versions are transmitted over said network as a stream of binary data, so as to prevent caching on a user machine.

8. The method of claim 1, wherein said step of generating said plurality of unique provided file versions further includes watermarking of a unique provided file version, said watermarking including one or more of:
(a) information from said user request;
(b) requesting user name;
(c) requesting user identification;
(d) requesting user network address;
(e) time of said user request;
(f) time of accessing said original file; and
(g) time of generation of said unique provided file version.

9. The method of claim 1, further comprising the steps of:
receiving a second user request for a second version of said original file;
generating a second unique provided file version respectively for said second user request, said generating based on said second version of said original file, said second user request, and configuration; and
presenting said second unique provided file in response to said second user request.

10. The method of claim 1, wherein said information facilitates accountability selected from a group consisting of:
(a) which user created said original file;
(b) which user requested said original file;
(c) which user retrieved each of said plurality of unique provided file versions;
(d) time of request for said original file;
(e) time of retrieval of said plurality of unique provided file versions;
(f) time of processing of said original file;
(g) type of processing of said original file;
(h) reasons for said user request;
(i) which pages of said plurality of unique provided file versions have been accessed through a secure presentation control; and
(j) watermarking information.

11. The method of claim 1, wherein said user request comprises a plurality of properties which are selected from a group consisting of:
(a) file format,
(b) file metadata,
(c) time of creation,
(d) date of creation,
(e) time of modification,
(f) date of modification,
(g) file content,
(h) portion of original file,
(i) additions to the original file, and
(j) watermarking.

12. A non-transitory computer-readable storage medium having embedded thereon computer-readable code for providing files, the computer-readable code comprising program code for:
receiving over a network a plurality of user requests for an original file from a plurality of different user machines of a plurality of users;
generating a plurality of unique provided file versions of said original file each for one of said plurality of user requests, said plurality of unique provided file versions are different from one another and from said original file;
wherein each of said unique provided file is generated based on the version of said original file, user request and configuration;
transmitting, over said network, each of said plurality of unique provided file versions to one of said plurality of different user machines in response to one of said plurality of user requests;
wherein each of said plurality of unique provided file versions having one or more elements which are different from respective one or more elements of all other of said plurality of unique provided file versions and of said original file, said one or more elements are selected from a group consisting of: a file format, a portion of said original file which is uniquely modified, a unique addition to a version of said original file, and a watermark indicative of at least one of an identity of a user associated with one of said plurality of user requests, a time of receiving one of said plurality of user requests, and a provided file generation time.

13. The non-transitory computer-readable storage medium of claim 12, further comprising program code for accessing said original file from a secure storage.

14. The non-transitory computer-readable storage medium of claim 12, further comprising program code for authenticating said user request prior to generating said plurality of unique provided file versions, and generating said plurality of unique provided file versions contingent on successful authentication of said user request.

15. The non-transitory computer-readable storage medium of claim 12, further comprising program code for, prior to generating said plurality of unique provided file versions:
sending said user request to a configuration server; and
receiving said configuration from said configuration server.

16. The non-transitory computer-readable storage medium of claim 12, further comprising program code for providing each of said plurality unique provided file versions to said plurality of different user machines in a secure presentation control that limits a set of operations associated with each of said plurality of unique provided file versions.

17. The non-transitory computer-readable storage medium of claim 12, further comprising program code for transmitting each of said plurality of unique provided file versions over said network as a stream of binary data so as to prevent caching on a user machine.

18. The non-transitory computer-readable storage medium of claim 12, further comprising program code for generating said plurality of unique provided file versions including watermarking, said watermarking including one or more of:
(a) information from said user request;
(b) requesting user name;
(c) requesting user identification;

(d) requesting user network address;
(e) time of said user request;
(f) time of accessing said original file; and
(g) time of generation of said plurality of unique provided file versions.

19. The non-transitory computer-readable storage medium of claim 12, further comprising program code for:
receiving a second user request for a second version of said original file;
generating a second unique provided file respectively for said second user request, said generating based on said second version of said original file, said second user request, and said configuration; and
providing said second unique provided file in response to said second user request; and
generating and providing protecting access to content of said second version of said original file.

\* \* \* \* \*